US 9,446,676 B2

(12) United States Patent
Reinschke

(10) Patent No.: US 9,446,676 B2
(45) Date of Patent: Sep. 20, 2016

(54) CHARGING STATION FOR WIRED CHARGING OF ELECTRIC VEHICLE

(75) Inventor: Johannes Reinschke, Nürnberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 239 days.

(21) Appl. No.: 13/983,253

(22) PCT Filed: Jan. 30, 2012

(86) PCT No.: PCT/EP2012/051394
§ 371 (c)(1),
(2), (4) Date: Aug. 1, 2013

(87) PCT Pub. No.: WO2012/104231
PCT Pub. Date: Aug. 9, 2012

(65) Prior Publication Data
US 2013/0307477 A1 Nov. 21, 2013

(30) Foreign Application Priority Data
Feb. 1, 2011 (DE) ........................ 10 2011 003 436

(51) Int. Cl.
H02J 7/00 (2006.01)
B60L 11/18 (2006.01)

(52) U.S. Cl.
CPC .......... B60L 11/1824 (2013.01); B60L 11/185 (2013.01); B60L 11/1816 (2013.01); H02J 7/0042 (2013.01); B60L 2230/16 (2013.01);
(Continued)

(58) Field of Classification Search
CPC ................ H02J 7/0027; H02J 7/0042; Y02T 10/70005; Y02T 90/14; Y02T 10/7055; Y02T 10/7088; Y02T 90/63; B60L 11/1818; B60L 1/01; B60L 11/1816; B60L 11/1824
USPC ........................................................ 320/109
See application file for complete search history.

(56) References Cited

U.S. PATENT DOCUMENTS

| 2,239,128 A * | 4/1941 | Sykes ........................... 312/400 |
| 2003/0120442 A1* | 6/2003 | Pellegrino et al. ............. 702/60 |
| 2010/0170670 A1* | 7/2010 | Catalano ....................... 165/185 |

(Continued)

FOREIGN PATENT DOCUMENTS

| CH | 688 598 A5 | 11/1997 |
| CN | 101056002 A | 10/2007 |

(Continued)

OTHER PUBLICATIONS

International Search Report for PCT/EP2012/051394; mailed Oct. 24, 2012.

(Continued)

Primary Examiner — Vuthe Siek
(74) Attorney, Agent, or Firm — Slayden Grubert Beard PLLC

(57) ABSTRACT

A charging post at a charging station for charging an electric vehicle can be lowered into the ground by a lifting device such that it does not become a physical obstacle or optically impair the environment and is not damaged by external influences.

13 Claims, 4 Drawing Sheets

(52) U.S. Cl.
CPC ....... *B60L 2270/32* (2013.01); *B60L 2270/34* (2013.01); *H02J 7/0027* (2013.01); *Y02T 10/7005* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2010/0199047 A1* | 8/2010 | Corrao et al. | 711/141 |
| 2010/0270523 A1* | 10/2010 | Schmitt et al. | 254/93 R |

FOREIGN PATENT DOCUMENTS

| | | |
|---|---|---|
| CN | 201018299 Y | 2/2008 |
| CN | 101895136 A | 11/2010 |
| DE | 1341305 U | 5/1934 |
| DE | 42 41 158 C1 | 1/1994 |
| DE | 10 2006 019 427 A1 | 10/2007 |

OTHER PUBLICATIONS

Office Action in corresponding Chinese application 201280007295.4 issued Apr. 1, 2015.

* cited by examiner

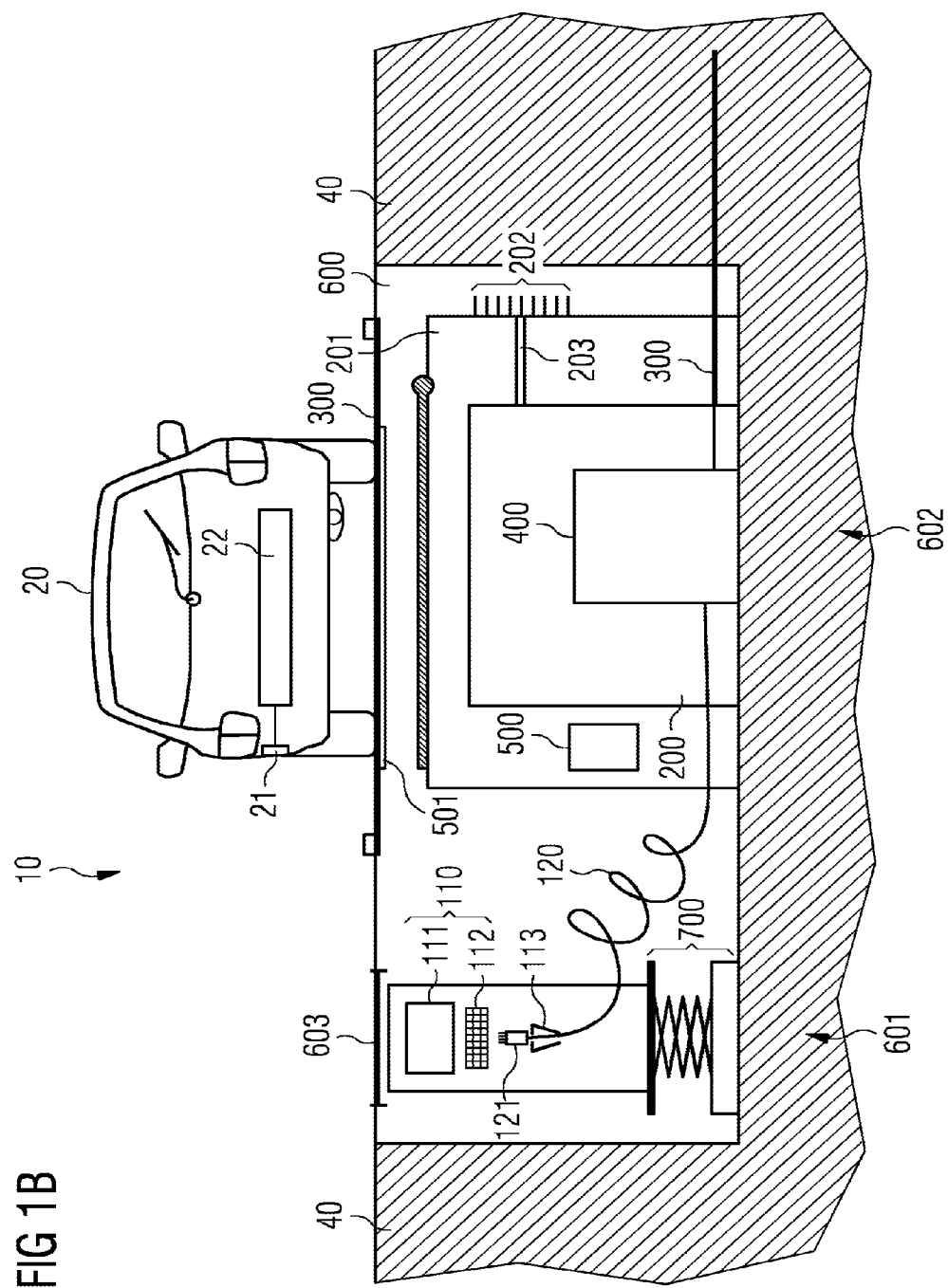

CHARGING STATION FOR WIRED CHARGING OF ELECTRIC VEHICLE

CROSS REFERENCE TO RELATED APPLICATIONS

This application is the U.S. national stage of International Application No. PCT/EP2012/051394, filed Jan. 30, 2012 and claims the benefit thereof. The International Application claims the benefit of German Application No. 10 2011 003 436.6 filed on Feb. 1, 2011, both applications are incorporated by reference herein in their entirety.

BACKGROUND

Described below are a charging station for charging an electric vehicle and the charging post thereof.

In the case of charging stations for electric vehicles, in particular for electric passenger vehicles, a differentiation is made between wire-bound and wireless charging stations or charging processes. Wireless charging takes place inductively so that the corresponding magnet coil of the charging station can, for example, be positioned directly under a surface of a parking spot on which the vehicle is parked for charging or positioned recessed into the surface of the parking spot. Therefore, the wireless charging station does not represent a physical obstacle and is also unobtrusive from an optical point of view.

In the case of a wire-bound charging process, a charging cable of the charging station is connected to a corresponding input connection of the electric vehicle. In the case of high-capacity charging stations, i.e. high-speed charging stations, the charging cable is firmly connected on the charging station side to the charging station or to the charging current source thereof and, at the other side, to a plug. In particular, in the case of AC charging stations, it is also possible for a socket to be present on the charging post and the charging cable then has a plug at both ends.

In the case of wire-bound charging, a differentiation is made between AC charging and DC charging. In the case of AC charging, the charging post provides an alternating current which is first rectified by a converter in the electric vehicle. In the case of DC charging, the charging station supplies the direct current with which the battery of the vehicle is charged directly, i.e. without the inclusion of further intermediate power-electronics components.

Typically, a much more powerful AC-DC converter is incorporated in a DC charging station than is sensible and possible in a vehicle. Unlike the case with AC charging with charging times of currently approximately 4 h to 8 h, the objective of DC charging is generally high-speed charging with charging times of about 15 min to 30 min for a charging capacity or energy of about 20 kWh to 40 kWh.

According to the related art, in the case of air cooling, the electrical and electronic components (including housing and cooling) required for a DC charging station with a output power of 50 kW to 100 kW occupy a volume of 0.5 m$^3$ to 1.0 m$^3$ and weigh several hundred kilograms. This means a complete DC charging station cannot be integrated in a slimline charging post with a width and a depth of, for example, about 20 cm to 30 cm, as is the case with AC charging.

Therefore, in the case of DC charging, the choice is to accommodate the power electronics in a separate receptacle or container and to use a visible charging post as in the case of AC charging, wherein this charging post only contains the charging cable and the charging plug for the vehicle and a control unit.

However, the use of the charging posts brings with it the problem that they are generally located in a freely accessible space and in a more or less public space so that they could possibly be perceived as having a negative impact on the environment, for example due to insufficient integration in the cityscape. In addition, due to their comparatively exposed position, charging posts are also disadvantageous for safety and maintenance reasons.

SUMMARY

Described below is a charging post and charging station for charging an electric vehicle which does not have the drawbacks described.

A charging post for an electric vehicle can be connected to the electric vehicle via a charging cable in order to charge the electric vehicle. The charging post can be retracted and extended with respect to a space, i.e. the charging post can be retracted into the space and extended back out of the space.

The space can for example be a hollow space enclosed by walls, wherein a possibly closeable opening through which the charging post can be moved into and out of the space is provided on one side of the hollow space. It is also possible for the space to be delimited by only at least one wall with an opening through which the charging post can be moved. This at least one wall is then located, for example, between the hollow space and the parking spot on which the electric vehicle can be parked for charging.

In a first operating state, the charging post is retracted into the hollow space. The first operating state is in particular the idle state in which no electric vehicle is to be charged. In a second operating state, in which an electric vehicle is to be charged or is charged, the charging post is extended out of the hollow space.

Therefore, only then is access available to the charging post and it is only visible when an electric vehicle is to be charged. At all other times, apart from any maintenance work or the like, the charging post is located in the space, i.e. it does not become a physical obstacle or optically impair the environment and is not damaged due to external influences.

Ideally, no electrical and electronic components required directly for charging are housed in the charging post such as, for example, power converters, filters and galvanic isolation. These components are located in a separate container. The charging post only has the charging cable and a control and communication unit via which the charging process is controlled and/or which is used for communication with the vehicle electronics, in particular with the vehicle's battery management system (BMS). The components required to provide the correctly dimensioned current and the associated voltage for charging the electric vehicle are exclusively located in the container.

The charging post is, therefore, substantially only an operator interface and a holding device for the charging cable for the plug thereof. The charging cable is only guided through the charging post and, if no charging process is taking place, suspended thereupon. Hence, the charging post is very light and it is possible to achieve a very small size in terms of volume.

The control unit is equipped with a display device and an input device, in particular a keyboard or keys. The display device provides, for example, information on the charging process and the charging process etc. An operator, for example the driver of the electric vehicle, can use the input device to start, interrupt and terminate the charging process and, optionally input additional information such as, for example, the amount of money he wishes to pay to charge the battery of the electric vehicle.

The display device can be a touch-sensitive display, which simultaneously offers the functions of the display device described in brief above and the input device.

The charging station for an electric vehicle includes:
- a charging post that can be retracted and extended with respect to a first space, as described above,
- a drive device, in particular a lifting, sliding or hinged device for bringing the charging post into and out of the hollow space, and
- a container, in which at least a part of the electrical and/or electronic components required directly for charging the electric vehicle is housed and to which the charging cable the charging post can be electrically connected.

In addition, the charging station includes a parking spot on which the electric vehicle can be parked for charging its battery. When extended out of the space, the charging post is located directly next to or optionally even on the parking spot.

Due to the retractable and extendable charging post, this charging station ensures minimum impairment of the environment and the best possible protection of the charging post against damage.

In a first embodiment, the first space, into and out of which the charging post can be brought, can be provided in the ground, i.e. under the surface of the ground. Here, the term "surface of the ground" should be generally as including, for example, road or roadway surfaces, the surface of a sidewalk, the earth's surface, turf etc. Therefore, the meaning of the term "surface of the ground" depends upon the environment in which the charging station is located or the place at which the charging post is to be lowered into the ground.

In a second embodiment, the first space is located in or behind a wall standing substantially to the side of the charging station. This wall can be the outer wall of a building or a freestanding wall such as, for example, a sight screen.

In a third embodiment, the first space is located in a ceiling bridging the charging station. Such a case, can for example, occur when the charging station is installed inside a building such as, for example, in a parking garage and, for reasons of space or ease of connection, the charging post may be arranged above the charging station.

The container can be located in a second hollow space in the ground, in particular underground under a parking spot for the electric vehicle to be charged.

The container may be housed in the same hollow space into which the charging post can be retracted, i.e. the container and charging post are located in the same, common hollow space.

In a special embodiment, the first hollow space is located in the container so that the charging post can be retracted into the container. This creates a compact unit including the charging post and container, which is simple to install and connect.

The container is in particular embodied with respect to shape and material such that heat that forms in the interior of the housing is diverted to the outside, for example into the earth to the greatest degree possible. This means that the container does not have to be supplied from outside with cooling media, such as, for example cooling water. The container only has to be connected to the local electricity supply network.

The outer wall of the container is ideally made of galvanized sheet steel.

The outer wall of the container has external fins which ensure an enlargement of the surface of the container wall and hence improved heat dissipation.

Components located in the interior of the container which emit heat in the operating state of the charging station are thermally connected to the outer wall. The thermal connection is provided in particular via heat conduction, for example by thermal bridges in the form of cooling plates connecting heat-emitting elements to the container wall. The thermal connection can also be based on the effect of heat convection and achieved in the container by air or water cooling, wherein the cooling, provided for example air or water, again transfers the absorbed heat to the container wall.

The container has a power connection, for example a sealable screw connection, to which a power supply can be connected to supply the charging station with electrical energy. Additionally or alternatively, a cable connection is provided to which the charging cable can be connected. A charging station with a container of this kind can be supplied pre-assembled and connected without having to intervene into the interior of the charging station during installation. In the alternative embodiment, in which, for example, the charging cable is firmly connected to the container or to the internal electronics etc., the container would have to be supplied jointly with the cable. If the container had no power connection, as described, connection to the power supply would also be much more complex.

In addition, the container includes a hatch, in particular a maintenance hatch, with which the container can be opened and closed. It is, for example, possible to lift the electrical and/or electronic components or parts thereof directly required for charging the electric vehicle as a unit out of the container through this maintenance hatch without having to detach electrical connection cables. It is also possible, at least with the partial removal of components, to enter the container via the maintenance hatch so that if need be necessary maintenance work can be performed.

The container and charging post may be embodied as a unit, for example as a cuboid volume with a type of access hatch from which the charging unit can be extended and positioned in a common hollow space encompassing the first and the second hollow space.

The container may include only a power connection and no further connections. In this embodiment, in particular the installation overheads are minimal and the charging station is a fully integrated and to a large extent pre-installed unit, which, as early as the production stage, is complete enough that, for installation, it only needs to be connected to an energy source, for example the main power supply.

The container can be housed in a building with a first space and a second space, wherein the two spaces can, for example, be adjacent. Here, the container is housed in the first space and arranged such that at least a part of the surface of the container, in particular a side wall of the container, functions as wall or floor heating for the second space.

This means this side wall itself forms a wall or a floor of the second space or is integrated in the wall or the floor of the second space or the medium, which passes through the wall or floor heating of the second space, is at least in part heated by the heat formed in the container during the operation of the charging station.

For the transmission of the heat, in the operating state of the charging station, heat-emitting components located in the interior of the container are thermally connected to the outer wall of the container, in particular via heat conduction and/or heat convection.

Advantageously, the charging station is embodied as a DC charging station. In the case of an AC charging station, it is not absolutely necessary to differentiate between the charging post and the container with the power electronics components.

To summarize, the following advantages are provided:

minimum disruption of the cityscape or the environment since only during the charging, the absolute minimum, namely the charging post with the control and communication unit and charging cable, is visible;

best possible protection against vandalism and damage;

sound insulation and damping by burial, i.e. no additional noise-control measures are required;

no external cooling device or no external cooling connections are required because the waste heat is emitted via the container-surface to the environment, for example the earth or a building;

with a suitable structural design, the charging station including extendable charging post and power electronics container can be treated as one unit, in particular in the case of a DC charging station;

no or reduced requirements with respect to the appearance of the part with the greatest volume of the charging station, of the container.

BRIEF DESCRIPTION OF THE DRAWINGS

These and other aspects and advantages, features and details may be derived from the exemplary embodiment described below, taken in conjunction with the accompanying drawings of which:

FIG. 1B is a schematic drawing of a charging station in the first embodiment with retracted charging post.

DETAILED DESCRIPTION OF THE PREFERRED EMBODIMENT

In the figures, identical or corresponding areas, components, or groups of components are identified with the same reference numbers.

Figure 1A:
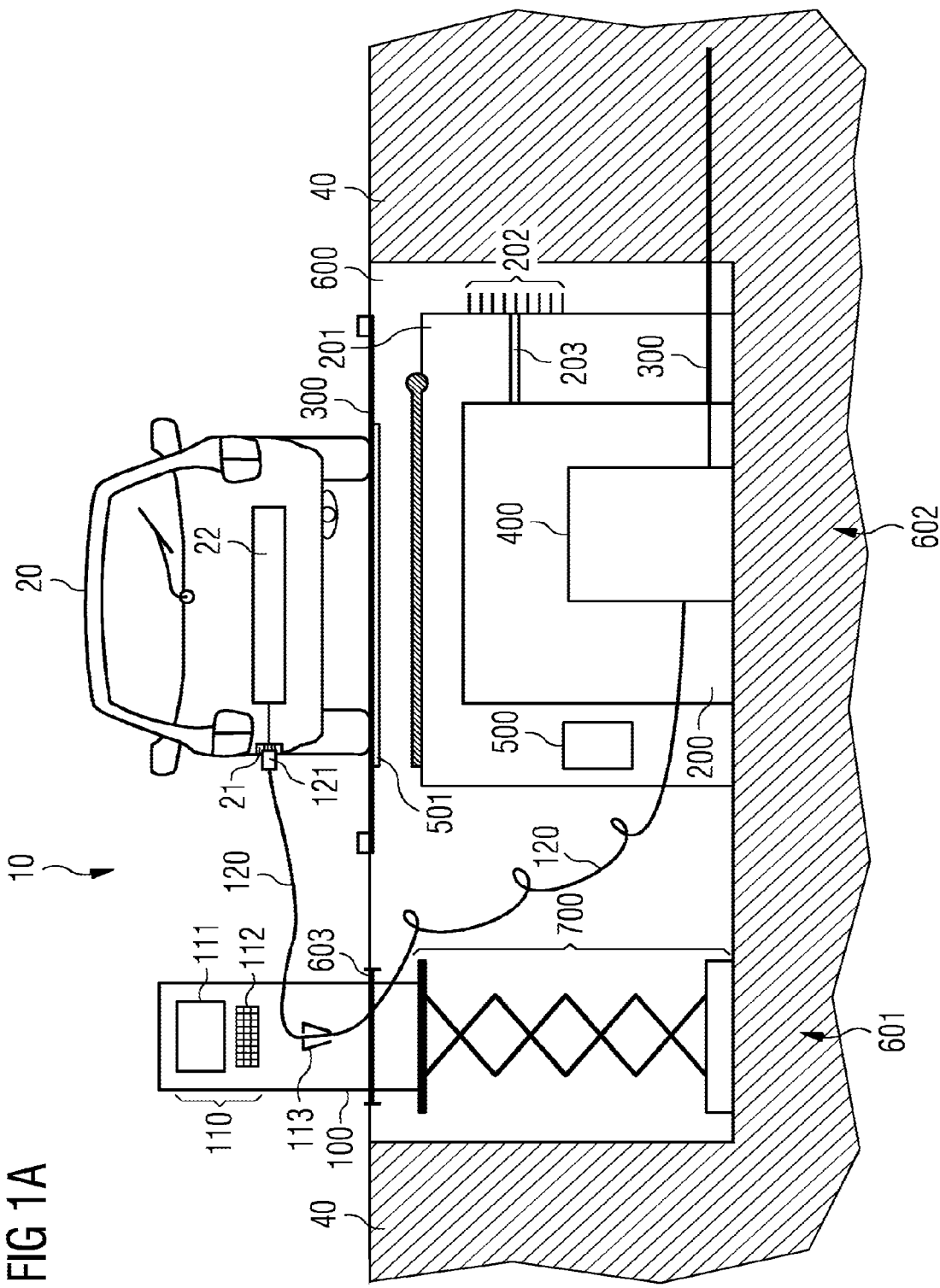
FIG. 1A is a schematic drawing of a charging station in a first embodiment with extended charging post.

FIG. 1A shows a charging station 10 with a charging post 100, a container 200, in which the electrical and electronic components required for a charging process of an electric vehicle 20 parked on a parking spot 300 of the charging station 10 are housed and a control unit 500, which inter alia controls and monitors the charging process.

Here, the electrical and electronic components are not shown in detail since the components required for an AC or DC charging process are known per se. For example, depending upon the type and desired power of the charging process, these are power electronics, ISO monitors, circuit breakers, galvanic isolation, an AC-DC power converter, filters etc. Since the precise selection and configuration of the electrical and electronic components is not of great significance, these components are combined symbolically in an electronic assembly, which is housed in the container 200.

The container 200 is located in an underground hollow space 600, which, in the case shown in FIG. 1A is located directly under the parking spot 300 and has two regions 601, 602, wherein the container 200 is positioned in the region 602. Depending upon the spatial conditions, the container 200 can also be housed in a different place, but the space under the parking spot 300 is most suitable for this purpose.

The material and external shape of the container 200 are embodied such that heat generated in the interior of the container 200 can be emitted via the container wall 201 to the environment, for example the surrounding earth 40. The container wall 201 is, for example, made of galvanized sheet steel, optionally with additionally applied external fins 202 for better heat dissipation.

The interior of the container 200 is designed such that heat-emitting elements, i.e. in particular the electrical and electronic components, transfer their heat to the container wall 201. This can, on the one hand, be achieved by heat conduction, for example by thermal bridges 203 in the form of cooling plates, which connect the heat-emitting elements 400 to the container wall 201. On the other hand, this can be achieved by heat convection, for example by air or water cooling in the container (not shown), wherein the respective cooling again transfers the absorbed heat to the container wall.

The charging post 100 includes a control device 110 with a display device 111 and an input device 112, for example a keyboard 112. The display device 111 is, for example, a display. In an advantageous embodiment, this is a touch-sensitive display so that this can simultaneously implement the functions of the display 111 and the keyboard 112. An operator, for example the driver of the electric vehicle 20 to be charged, can use the control device 110 to start, optionally interrupt and terminate and monitor the charging process and possibly to input further entries or retrieve information.

The charging post 100 also has a charging cable 120. The charging cable 120 is sealed at one end with a charging plug 121, which can be connected to a corresponding socket 21 of the electric vehicle 20 and via this to the battery 22 thereof. The other end of the charging cable 120 is connected to the electronic assembly 400, which provides the electrical energy required to charge the electric vehicle 20. To this end, the electronic assembly 400 is connected to a power supply 30, which can, for example, be connected to the public power network.

The charging post 100 is characterized in that, by a lifting device 700, it can be lowered into the hollow space 600 of the charging station 10 extended out of this again. Here, this can be the same hollow space 600 in which the container 200 is housed, wherein the charging post can be lowered in the region 601 of the hollow space 600. The lifting device 700 is controlled by the control unit 500 and can, for example, operate in the manner of an electrically, hydraulically or pneumatically driven lifting platform.

FIGS. 1A and 1B show two operating states of the charging station 10. The operating state shown in FIG. 1B corresponds to the idle state of the charging station 10 in which no vehicle is located in the charging station for charging. In this case, the charging post 100 is retracted into the hollow space. The charging plug 121 is secured to a corresponding device 113 on the charging post 120. This device 113 can, for example, be a recess or trough, in which the plug 121 can be inserted and optionally locked or also a hook or the like on which the plug 121 can be suspended. In idle state, the charging post 100 does not become a physical obstacle or optically impair the environment and is not damaged by external influences.

If, in the second operating state of the charging station 10 as shown FIG. 1A, an electric vehicle 20 to be charged is located on the parking spot 300 of the charging station 10, the charging post 100 is extended out of the hollow space 601 by the lifting device 700 on the instigation of the control unit 500. For example, the control unit 500 can be connected to sensors 501 on the parking spot 300 which report the presence of a vehicle 20 on the parking spot 300. Alternatively, the control unit 500 can also initiate the extension of the charging post 100 out of the hollow space 601 at the instigation of an operator of the charging station 10.

When the charging post 100 has been extended, the operator, for example the driver of the electric vehicle 20, can, on the one hand take hold of the charging plug 121 and connect it to the charging socket 21 of the electric vehicle 20. On the other hand, the operator can start the charging process via the keyboard 112 of the control device 110 of the charging post 100 and optionally input parameters for the charging process such as, for example, the desired degree of charging and/or a specific amount of money, for which the operator wishes to charge the battery 22 of the electric vehicle 20. The operator can identify from the display 111 the charging process of the battery 22 and possibly other parameters relating to the charging process, such as for example the time required to the end of the charging process.

After the end of the charging process or at the instigation of the operator or the owner of the charging station, the charging post 100 is retracted back into the hollow space 600.

The charging cable 120, is, for example, rolled up when the charging post 100 is retracted into in the hollow space 601. Alternatively, the charging cable 120 can be wound in a spiral or in a comparable way to the looping of fire hose and hence reversibly changed in its length.

Figure 2:
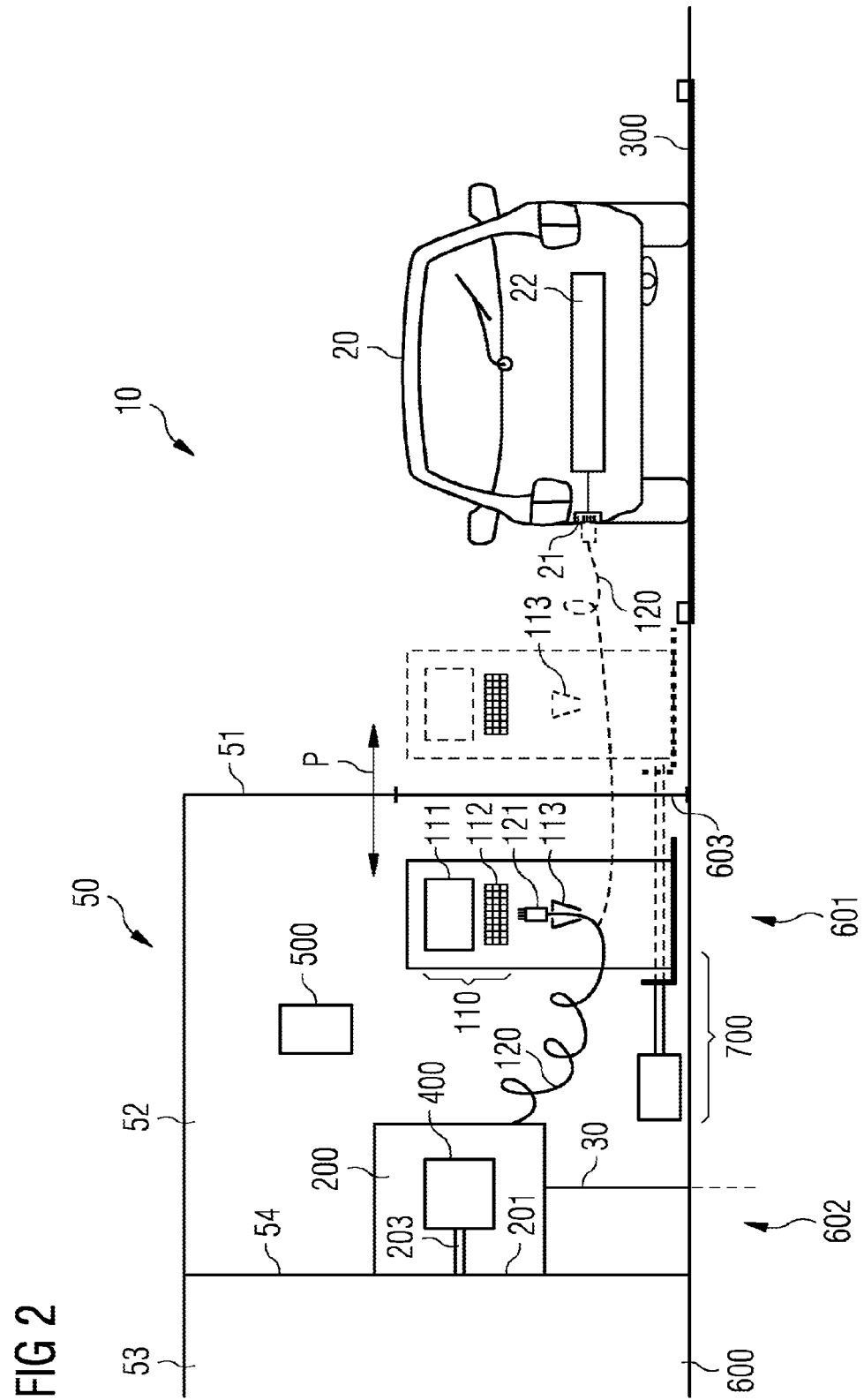
FIG. 2 is a schematic drawing of a charging station in a second embodiment.

In FIGS. 1A and 1B, the charging post 100 and the container 200 are located in the same underground hollow space 600. However, depending upon the spatial conditions, the charging post 100 and container 200 can also be located in separate hollow spaces. For example, it would be conceivable, as indicated in FIG. 2, for the charging station 10 to lie next to a building 50 with a outer wall 51 so that the hollow space 601 into which the charging post 100 can be lowered can be provided in or behind the wall 51 of the building 50 and is for example a room in the building 50. I.e. unlike the case in FIGS. 1A and 1B, the charging post 100 does not move in the vertical direction, but, as symbolized by the arrow P, in the horizontal direction. To move the charging post 100 into and out of the hollow space 601, a device 700 is provided, which is able to slide the charging post 100 in horizontal direction. Here, the device 700 is also controlled by the control unit 500 and can, for example, work in the manner of an electrically, hydraulically or pneumatically driven lifting platform.

In FIG. 2, the charging post is again depicted with dashed lines outside the hollow space 601 and once with a continuous line in the hollow space 601, wherein the dashed depiction corresponds to the state of the charging station 10 in which the electric vehicle 20 is to be charged.

In the case shown here, the container 200, which in FIG. 2 is shown symbolically only without the electronic assembly and other details, is also located in the building 50. In particular, the hollow space 602, in which the container 200 is housed, lies directly next to the hollow space 601 of the charging post 100, i.e. here once again, the hollow spaces 601, 602 form two regions of a common hollow space 600.

However, in another embodiment, the container 200 can also be arranged in another place. For example, it would be conceivable to house the container 200 in a cellar of the building 50 or as shown in FIG. 1 under the parking spot, i.e. the hollow spaces 601, 602 would be arranged spatially separate from one another.

In a development of this embodiment, the wall 51 is not the wall of a building, but a freestanding wall such as, for example, a sight screen or soundproofing. In the idle state, therefore, the charging post is located not as in the previous exemplary embodiments in an enclosed space 601 surrounded by walls, but in a space that is open on at least one side 601 behind the sight screen.

It is conceivable, for the case shown in FIG. 2 of a charging station installed in a building 50, for the purposes of cooling the container or the electronics located in the container, for at least a part of the surface of the container 200 simultaneously to function as wall or floor heating or the like. One possible implementation is shown in FIG. 2, wherein the building 50 has two rooms 52, 53 separated by a wall 54. The container 200 and the charging post 100 in the idle state and the other components of the charging station 10 are located in the first space 52. As described in connection with FIG. 1, in the case shown in FIG. 2, the container 200 is configured such that heat-emitting elements, i.e. in particular the electrical and electronic components transfer their heat to the container wall 201. Here, once again, this can be achieved on the one hand by heat conduction, for example by thermal bridges (not shown) in the form of cooling plates, which connected the heat-emitting elements 400 to the container wall 201. On the other hand, this can be achieved by heat convection, for example by air or water cooling in the container (not shown), wherein the respective cooling again transfers the absorbed heat to the container wall 201 and hence to the wall 54.

Figure 3:
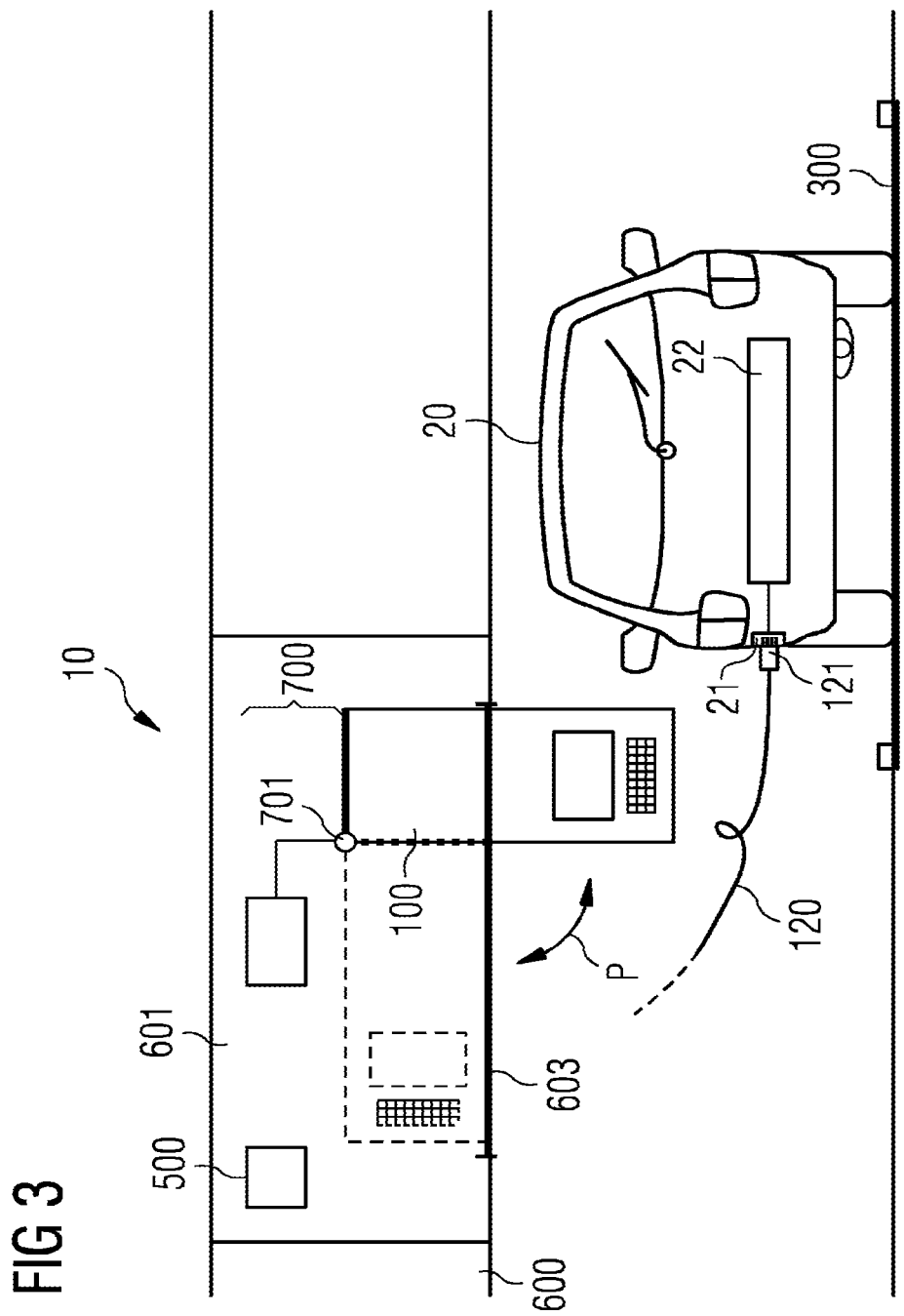
FIG. 3 is a schematic drawing of a charging station in a third embodiment.

In a further embodiment, which is indicated schematically in FIG. 3, the charging station 10 is located in an enclosed environment, for example in a building, such as a parking garage, so that the charging station 10 is covered by a ceiling 60. In this situation, it is conceivable that the hollow space 601 for the lowering of the charging post 100 is provided not in the ground as shown in FIG. 1, but in the ceiling 60. Therefore, in this case, the charging post 100 is lowered out of the ceiling for charging an electric vehicle 20 on the parking spot 300.

In the case of the above-described exemplary embodiments, the movement of the charging post is in each case a rectilinear movement or a translation. For example, for the case shown in FIG. 3, in which the hollow space 601 is provided in the ceiling 60, it could be possible that the thickness or strength of the ceiling 60 is not sufficient to lower the charging post 100 completely therein since it is possible that, along the longitudinal axis, the charging post 100 may be larger or only insignificantly smaller than the thickness of the ceiling 60.

This case is shown in FIG. 3. To resolve the stated problem, the device 700 with which the charging post may be brought into and out of the hollow space 601 is not embodied as a lifting or sliding device, but as a hinged device. The hinged device 700, enables the charging post 100 to be swung about an axis 701 into and out of the hollow space 601. For reasons of simplicity, the other components of the charging station, for example the container 200 and the charging cable 120, are not shown or only indicated in FIG. 3. For example, the container can be located in the ground below the charging station 10. Alternatively, the container can also be housed above the charging station 10 in the ceiling 60. This depends upon the spatial conditions.

Here, the depiction with a dashed line corresponds to the idle state in which the charging post 100 is swung into the hollow space 601. Here too the arrow P symbolizes the direction of movement of the charging post 100.

The hinged device 700 can also be used in place of the lifting device 700 in FIG. 1. The type of device 700 substantially depends on the spatial conditions in the environment of the hollow space 601 for the charging post.

For all the above explained exemplary embodiments, the hollow space 601 has an opening 603 through which the charging post 100 may be brought into and out of the hollow space 601. Ideally, in the idle state, i.e. when the charging post 100 is located in the hollow space 601, the opening 603 is sealed by a cover 604. When the charging post 100 is to be extended out of the hollow space 601, initially the cover 604 is automatically removed. The cover 604 can, for example, be a flap or a sliding element.

A combination of the embodiments shown in the figures is possible. For example, as indicated in FIG. 2, the hollow space 601 of the charging post 100 can be located in a building, while the container 200 can be arranged underground, as shown in FIG. 1.

Ideally, the charging post 100 and container 200 are embodied as a unit and as such can be lowered into the earth, i.e. in this embodiment, the charging post 100 is located in the container 200.

A sealable connection 204, for example a screw connection, may be provided on the outer wall of the container 201 for the connection of the power supply 30. A charging station 10 of this kind can be supplied pre-assembled and connected during installation without any intervention having to be made into the interior of the charging station 10 or the container 200.

The container 200 of the charging station 10 also has a maintenance hatch 205 on the upper side of the container. Through this maintenance hatch 205, it is possible, for example, to lift the electronic assembly 400 wholly or partly out of the container 200 without having to detach electrical connection cables.

Moreover, at least with a remote power electronics part, the container 200 can be accessed via the maintenance hatch 205 so that necessary maintenance work can be performed if need be.

The charging post 100 is in principle only an operator interface and a device for holding the charging cable 120 or for the plug 121 thereof. It is not, in principle, necessary for the charging cable 120 to be borne or held by the charging post, since the charging post 100 does not have any electrical or electronic components required for the actual charging process and so the charging post itself is insignificant with respect to the charging process. It would, therefore, be quite conceivable to arrange the charging cable 120 quite independently and separately of the charging post 100. However, for reasons of comfort it is advantageous to combine the charging post 100 and charging cable 120 in order to offer the option of suspending the charging cable 120 on the charging post 100, since the operator can then perform the charging station operation via the control device 110 and accommodate the charging plug 121 at one and same location.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A charging station in a first space of a building having a second space, for charging an electric vehicle via a charging cable, comprising:
    a charging post retractable and extendable into and out of a hollow space and including a control unit having a display device and an input device;
    a drive device, embodied as a lifting, sliding or hinged device, moving the charging post into and out of the hollow space; and
    a container, housing at least some electrical and/or electronic components required for charging the electric vehicle and to which the charging cable can be electrically connected, at
    least part of an outer wall of the container forming at least a portion of one of a wall and a floor of the second space in the building, heat being conducted from the first space to the second space via the side wall of the container.

2. The charging station as claimed in claim 1, wherein the hollow space into which the charging post is retractable is one of below ground level, in or behind a side wall and in a ceiling.

3. The charging station as claimed in claim 2, wherein the container is located in a separate space below the ground level.

4. The charging station as claimed in claim 2, wherein the container is housed in the hollow space into which the charging post is retractable.

5. The charging station as claimed in claim 2, wherein the hollow space is located in the container.

6. The charging station as claimed in claim 5, wherein the container is constructed of a material and in a shape that transfers heat generated inside the container to outside of the container.

7. The charging station as claimed in claim 6, wherein the container has an outer wall that is at least one of made from galvanized sheet steel, formed with external fins and components located in the interior of the container which output heat during the operating state of the charging station are thermally connected to the outer wall of the container, in particular via heat conduction and/or heat convection.

8. The charging station as claimed in claim 7, wherein the container further includes at least one of a power connection connectable a power supply for the charging station, and a cable connection to which the charging cable can be connected.

9. The charging station as claimed in claim 8, wherein the container further includes a hatch, providing maintenance access, that can be opened and closed.

10. The charging station as claimed in claim 2, wherein the container and charging post are embodied as one unit located in the hollow space when the charging post is retracted.

11. The charging station as claimed in claim 10, wherein the container has a power connection and no other connection.

12. The charging station as claimed in claim 1,
    further comprising heat emitting components located in the container, and
    wherein, during operation of the charging station, the heat emitting components in the container are thermally connected to the outer wall of the container via at least one of heat conduction and heat convection.

13. The charging station as claimed in claim 12, wherein the charging station is a direct current charging station.

\* \* \* \* \*